(12) United States Patent
Plavetich et al.

(10) Patent No.: US 7,219,949 B1
(45) Date of Patent: May 22, 2007

(54) MOTOR VEHICLE DOOR HAVING A CLOSURE EXTENDING FROM A BOTTOM THEREOF

(75) Inventors: Richard Plavetich, Laguna Beach, CA (US); John Cupit, Olivenhain, CA (US)

(73) Assignee: Nissan Design America, Inc., San Diego, CA (US)

( * ) Notice: Subject to any disclaimer, the term of this patent is extended or adjusted under 35 U.S.C. 154(b) by 0 days.

(21) Appl. No.: 11/315,632

(22) Filed: Dec. 22, 2005

(51) Int. Cl.
*B60J 1/08* (2006.01)

(52) U.S. Cl. .................. 296/146.2; 49/502

(58) Field of Classification Search ........... 296/146.2; 49/501, 502
See application file for complete search history.

(56) References Cited

U.S. PATENT DOCUMENTS

| | | | | | |
|---|---|---|---|---|---|
| 4,653,230 | A | * | 3/1987 | Seo et al. ............. | 49/502 |
| 4,914,863 | A | * | 4/1990 | Laukhuf ............... | 296/146.2 |
| 4,974,365 | A | * | 12/1990 | Ono ..................... | 49/502 |
| 5,007,201 | A | * | 4/1991 | D'Hoore et al. ....... | 49/502 |
| 5,480,729 | A | * | 1/1996 | Hattori et al. ......... | 428/593 |
| 5,697,626 | A | * | 12/1997 | McDaniel et al. ..... | 280/166 |
| 5,810,423 | A | * | 9/1998 | Brackmann et al. ... | 296/146.2 |
| 6,134,841 | A | * | 10/2000 | Schneider ............. | 296/190.11 |
| 6,220,656 | B1 | * | 4/2001 | Martin, Jr. ............ | 296/215 |
| 6,594,955 | B1 | * | 7/2003 | Delire et al. .......... | 49/502 |
| 6,805,355 | B2 | * | 10/2004 | Ishibashi et al. ...... | 296/146.11 |
| 6,890,044 | B2 | * | 5/2005 | Sakanoue et al. ..... | 312/321.5 |
| 7,048,322 | B2 | * | 5/2006 | DeBono ............... | 296/146.11 |
| 2002/0073626 | A1 | * | 6/2002 | Ringger ............... | 49/502 |
| 2003/0188492 | A1 | * | 10/2003 | Bonnett et al. ........ | 49/502 |
| 2006/0144598 | A1 | * | 7/2006 | Johnson ............... | 169/24 |

OTHER PUBLICATIONS

Mark Vaughn, Spirited Speedster: It Lets You Race Even When It's in Park (AutoWeek), Nov. 14, 2005, pp. 16-17.

* cited by examiner

*Primary Examiner*—Kiran B. Patel
(74) *Attorney, Agent, or Firm*—Young Basile Hanlon MacFarlane & Helmholdt, P.C.

(57) ABSTRACT

A door of a motor vehicle has a substantially rigid sheet that extends downwardly from a lower edge of the door. The sheet may be opaque, translucent, or transparent. The sheet may be fixed in the extended position or may be selectively retractable and extendable.

12 Claims, 5 Drawing Sheets

MOTOR VEHICLE DOOR HAVING A CLOSURE EXTENDING FROM A BOTTOM THEREOF

BACKGROUND

Technical Field

The present invention relates generally to motor vehicles and in particular the present invention relates to a motor vehicle door having a closure extending from a bottom thereof.

It can be difficult to enter or exit some motor vehicles, e.g., some sports automobiles, through a door opening because a lower portion of the frame of the door opening, e.g., a portion of the rocker panel, may interfere with the occupant's legs. Moreover, presence of the doors often impairs visibility while maneuvering a motor vehicle, such as during parking.

For the reasons stated above, and for other reasons stated below which will become apparent to those skilled in the art upon reading and understanding the present specification, there is a need in the art for alternative doors for motor vehicles.

SUMMARY

The above-mentioned problems with doors of motor vehicles and other problems are addressed by the present invention and will be understood by reading and studying the following specification.

For one embodiment, the invention provides a door of a motor vehicle having a selectively movable substantially rigid sheet that is selectively downwardly extendable from a lower edge of the door.

For another embodiment, the invention provides a door of a motor vehicle having a windowpane that extends downwardly from a lower edge of the door for closing an opening located below the door.

Further embodiments of the invention include methods and apparatus of varying scope.

DETAILED DESCRIPTION

Figure 1:
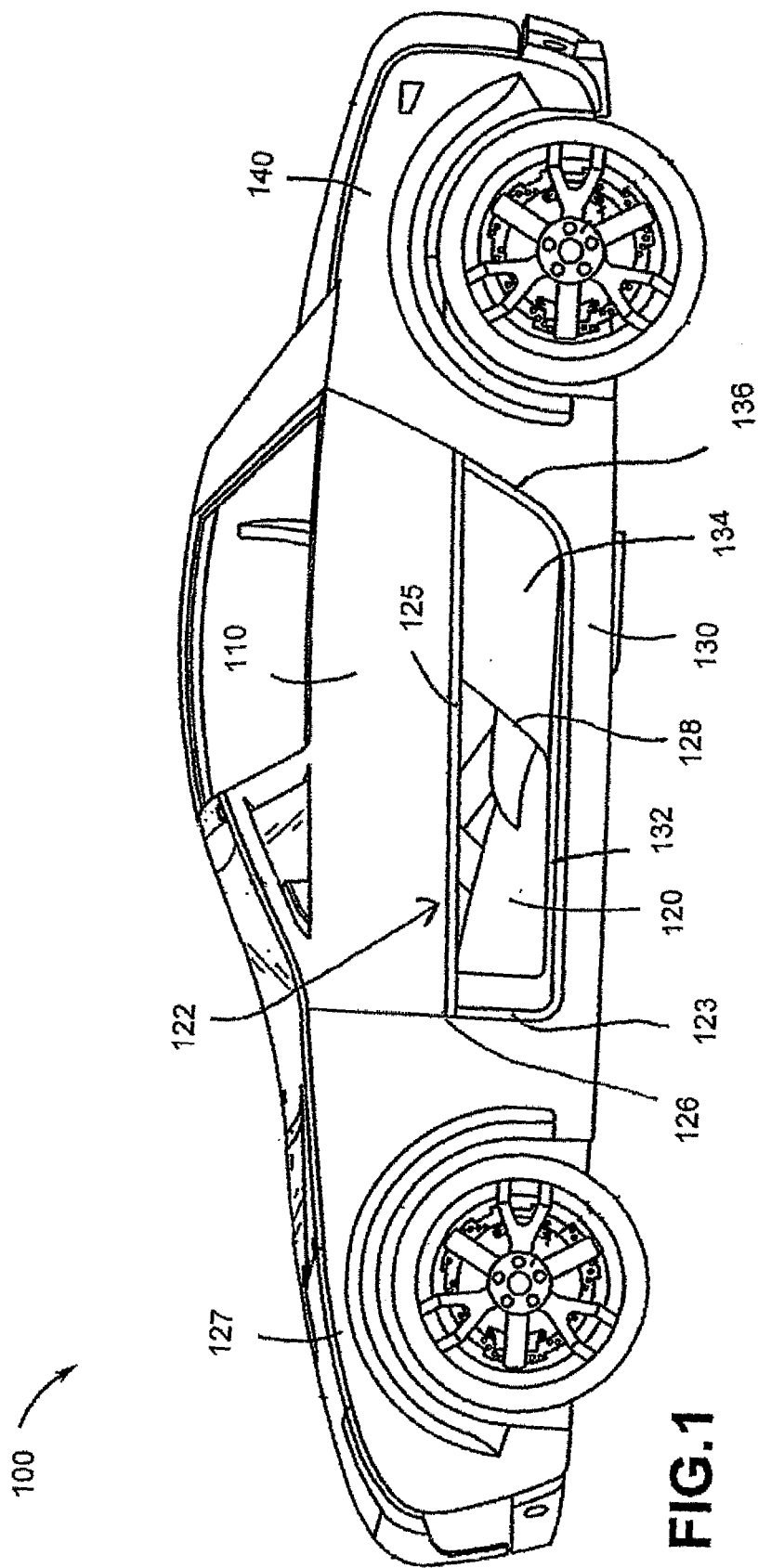
FIG. 1 is a side view of a motor vehicle having its door in a closed position, according to an embodiment of the invention.

In the following detailed description of the invention, reference is made to the accompanying drawings that form a part hereof, and in which is shown, by way of illustration, specific embodiments in which the invention may be practiced. In the drawings, like numerals described substantially similar components throughout the several views. These embodiments are described in sufficient detail to enable those skilled in the art to practice the invention. Other embodiments may be utilized and structural, logical, and electrical changes may be made without departing from the scope of the present invention. The following detailed description is, therefore, not to be taken in a limiting sense, and the scope of the present invention is defined only by the appended claims and equivalents thereof.

Figure 2:
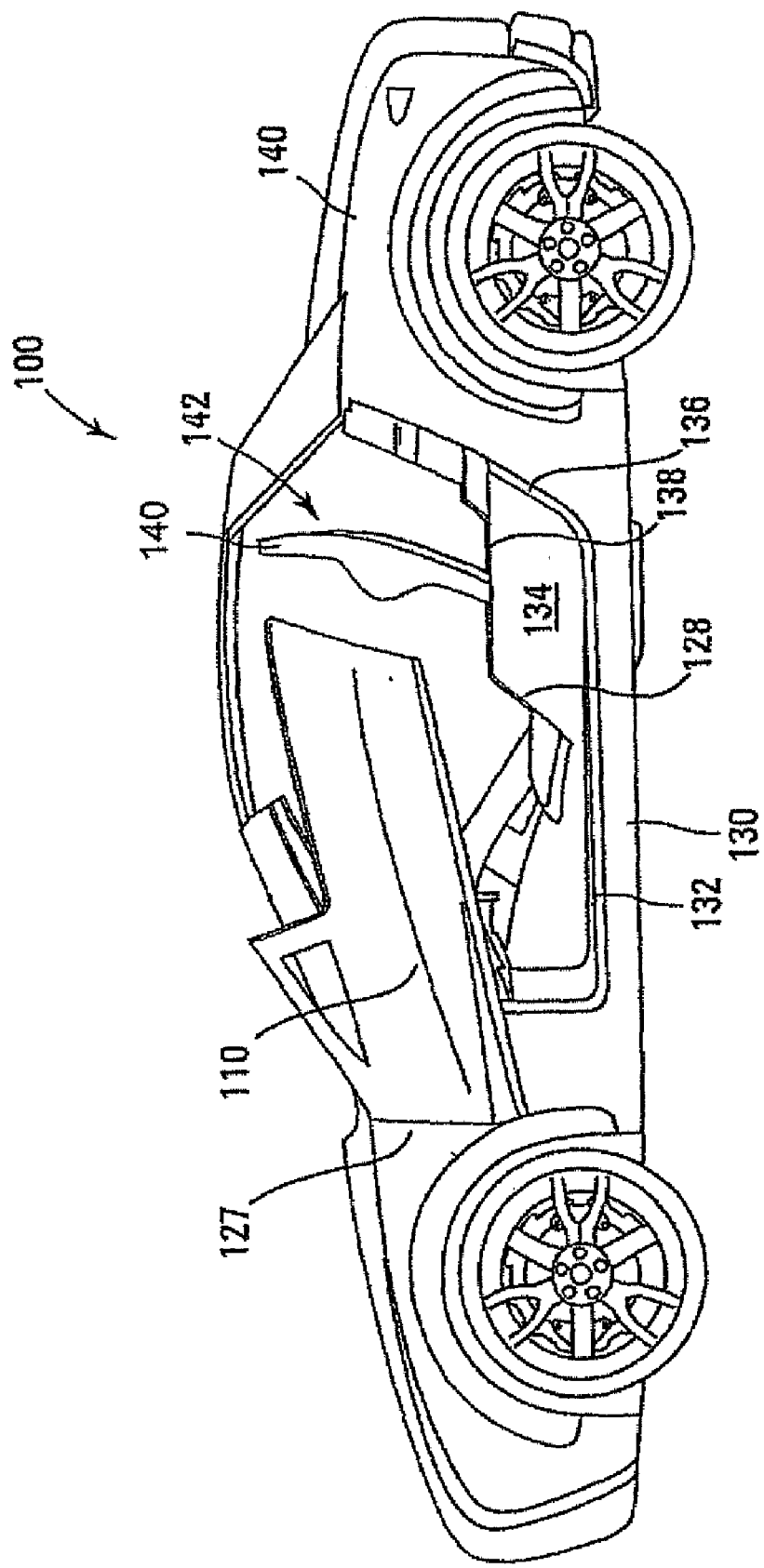
FIG. 2 is a side view of a motor vehicle having its door in an open position, according to another embodiment of the invention.

FIG. 1 is a said view of a motor vehicle 100, such as a sports automobile (or car), having its door 110 in a closed position, according to an embodiment. FIG. 2 is a side view of a motor vehicle 100 having its door 110 in an open position, according to another embodiment. Terms used herein to denote locations and directions, such as up, down, rear, front, forward, above, below, upper, lower, etc., are taken relative to motor vehicle 100.

For one embodiment, there is an opening (or window) 120 extending in a vertical direction between a portion of a lower edge 125 of door 110 and an upper portion 132 of a rocker panel 130, as shown in FIG. 1. Note that upper portion 132 of a rocker panel 130 forms a lower, substantially horizontal portion (or a sill) and lower edge 125 of door 110 forms an upper, substantially horizontal portion of a frame 122 that surrounds opening 120. Further, for another embodiment, opening 120 extends rearwardly, relative to vehicle 100, in a horizontal direction from a forward upright portion 123 of frame 122 to a rear upright portion 128 of frame 122, as shown in FIG. 1. For one embodiment, forward upright portion 123 of frame 122 is adjacent a front (or forward) edge 126 of door 110 and front quarter panel 127. For another embodiment, rear upright portion 128 of frame 122 corresponds to a front (or forward) portion of a panel 134.

For another embodiment, panel 134 extends upwardly toward an upper portion of vehicle 100 from upper portion 132 of rocker panel 130 and extends rearwardly toward the rear of vehicle 100 from the front portion 128 to substantially an edge 136 of a rear quarter panel 140, as shown in FIGS. 1 and 2. For some embodiments, another portion of lower edge 125 of door 110 closes against an upper edge 138 of panel 134 (FIG. 2) when door 110 is in the closed position. For other embodiments, door 110 may seal against upper edge 138 of panel 134 when door 110 is in the closed position. For another embodiment, panel 134 is integral with upper portion 132 of rocker panel 130 and may be taken as an extension of rocker panel 130. Note that, for a further embodiment, the front portion of panel 134 may be located in front, relative to vehicle 100, of a backrest 140 of a seat 142. For one embodiment, the front portion of panel 134 may be located between backrest 140 of seat 142 and a front edge of seat 142, as shown in FIG. 2.

Figure 3:
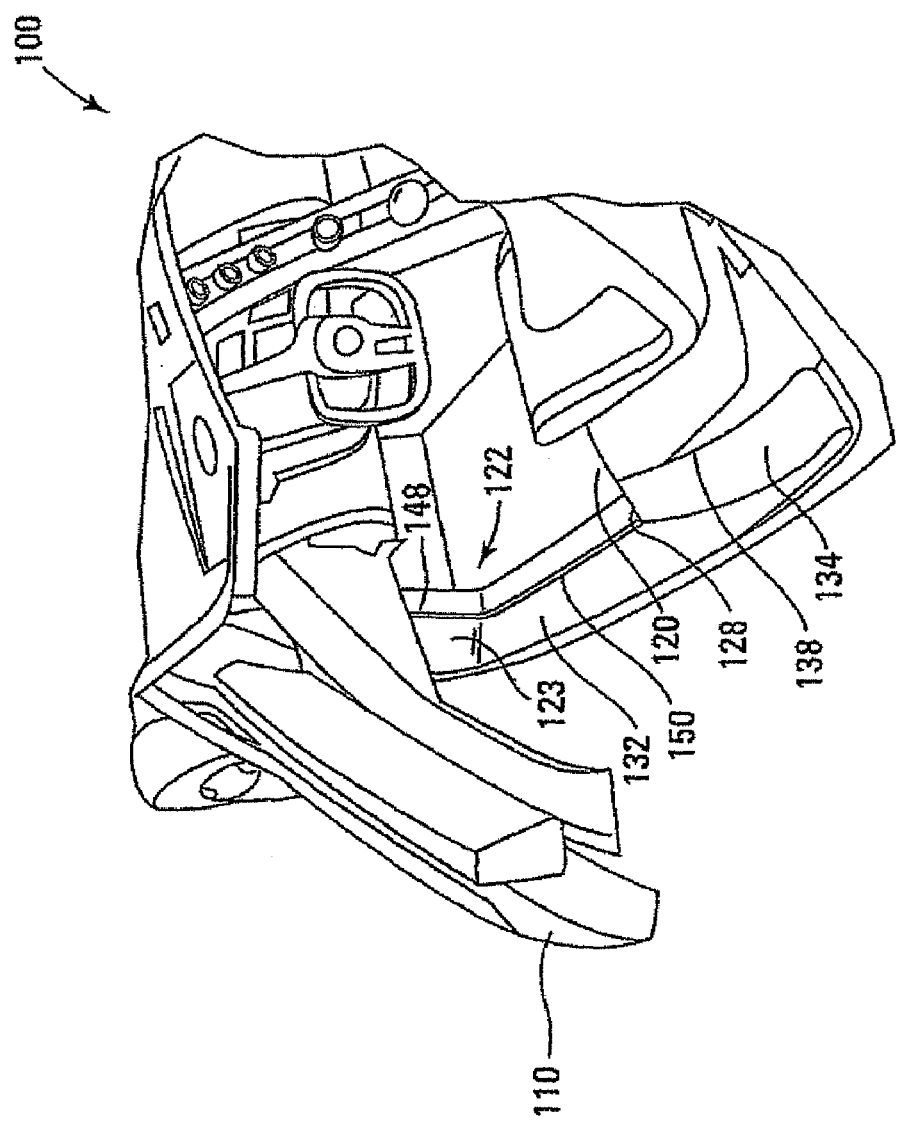
FIG. 3 is a view of an operator's side of a motor vehicle taken from the top of the vehicle, according to another embodiment of the invention.

FIG. 3 is a view of an operator's side of vehicle 100 taken from the top of vehicle 100. Note that a channel (or track) 148, for one embodiment, is disposed in a lower portion of frame 122 located below lower edge 125 of door 110. Specifically, channel 148 is disposed in forward upright portion 123, upper portion 132 of rocker panel 130 and rear upright portion 128. For some embodiments a seal 150 is disposed in channel 148 as shown in FIG. 3.

As indicated above, rear upright portion 128 corresponds to the front portion of panel 134. Note that the front portion of panel 134 extends inward toward seat 142, as shown in FIG. 3, for one embodiment.

Figure 4:
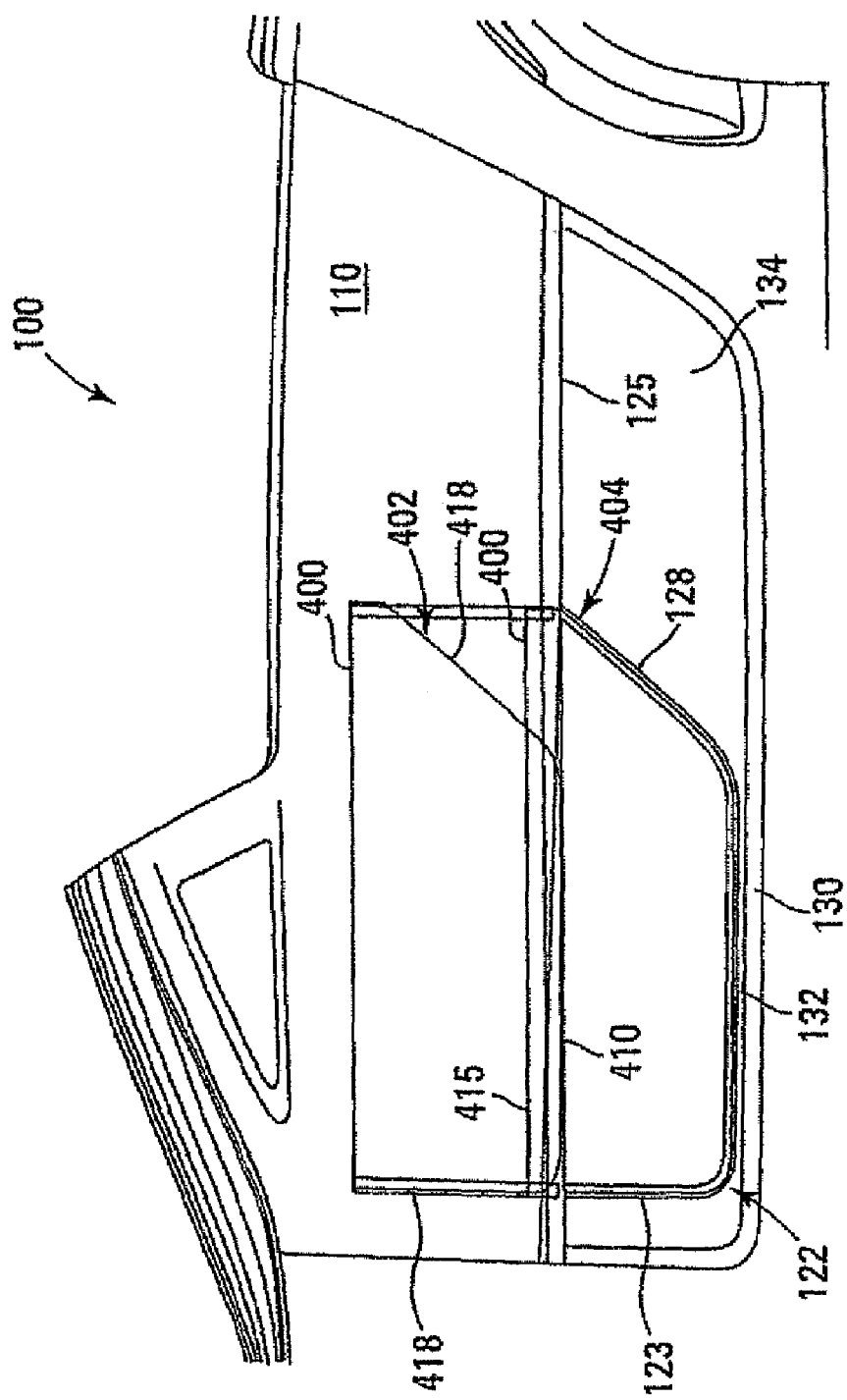
FIG. 4 is a side view illustrating a selectively movable sheet disposed in a door of a motor vehicle, according to another embodiment of the invention.

FIG. 4 is a side view illustrating a selectively movable sheet (or closure) 400 disposed in door 110, according to another embodiment. FIG. 4 illustrates sheet 400 retracted into door 110 corresponding to an open position, as designated by reference number 402, and in a closed position, as designated by reference number 404, extending from door 110 so as to close opening 120. For one embodiment, sheet 400 is substantially rigid and may be opaque, translucent, or transparent. For another embodiment, sheet 400 may be of metal, fiberglass, plastic, glass, such as windowpane commonly used for motor vehicle windows, one-way glass etc.

For one embodiment, when sheet 400 is retracted into door 110, its lower edge 410, relative to motor vehicle 100, may be substantially flush with lower edge 125 of door 110, as shown in FIG. 4, or may lie slightly above lower edge 125 of door 110. For one embodiment, when sheet 400 is in the closed position 404, an upper edge 415 remains slightly above lower edge 125 of door 110, as shown in FIG. 4. Moreover, when sheet 400 is in the closed position 404, lower edge 410 and opposing lateral edges 418 seal against seal 150. For some embodiments, seal 150 is recessed into channel 148 (FIG. 3) so that opposing lateral edges 418 of sheet 400 may ride in a portion of the channel 148 as sheet 400 is raised and lowered.

Note that retracting (or raising) sheet 400 into door 110 opens opening (or window) 120, and extending (or lowering) sheet 400 from door 110 closes opening 120. For one embodiment, sheet 400 may be raised and lowered manually, e.g., using a crank mechanically coupled to sheet 400, or electrically using a switch electrically coupled to an electrically powered actuator mechanically coupled to sheet 400, as is common for raising and lowering window glass in motor vehicles. For one embodiment, sheet 400 is raised before opening door 110 to enable a user to open door 110. Note that for some embodiments, sheet 400 may ride in channel 148 as sheet 400 is raised and lowered and sheet 400 may seal against seal 150 when sheet 400 is in the closed position. This acts to prevent opening of door 110 when sheet 400 is in the closed position. Note that sheet 400 may be raised into the open position while motor vehicle is in motion. For other embodiments, sheet 400 is fixed in the extended position (or closed position 404) and cannot be retracted or extended.

Figure 5:
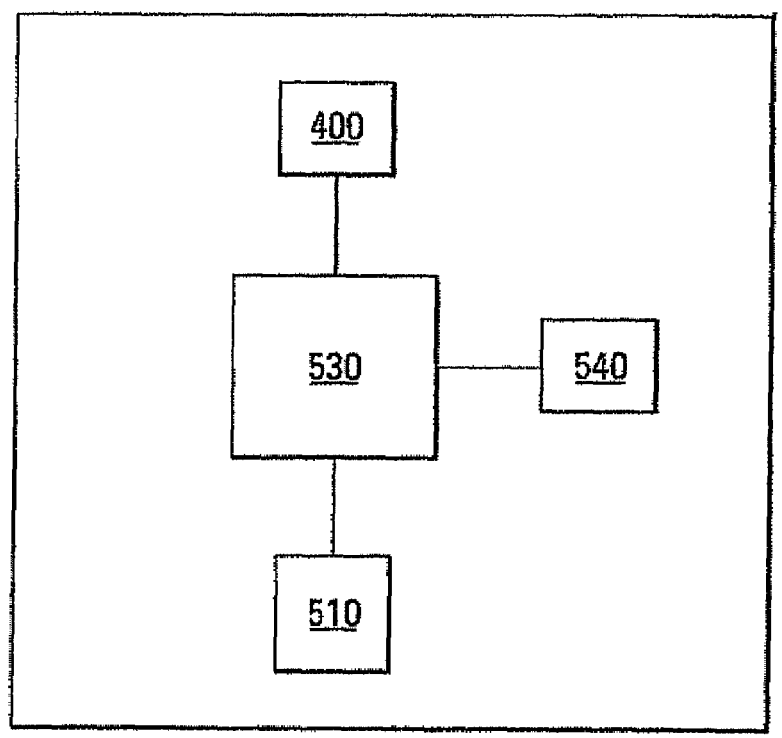
FIG. 5 is a block diagram of a portion of a door of a motor vehicle, according to another embodiment of the invention.

FIG. 5 is a block diagram of a portion of a door of a motor vehicle, such as door 110 of motor vehicle 100 of FIGS. 1–4, according to another embodiment. The door 110 has a sensor 510 that is activated in response to an occupant of the motor vehicle moving an interior door-handle on an interior side of the door, located in the interior of the motor vehicle when the door is closed, or an exterior handle on the exterior of the motor vehicle to unlatch the door for opening the door. For one embodiment, movement of the handle causes a portion of the handle to engage sensor 510, causing sensor 510 to transmit a signal. Sensor 510 transmits the signal to an electrically powered actuator 530 that is mechanically coupled to sheet 400. The signal causes actuator 530 to retract sheet 400 into the door, thereby opening window 120. For one embodiment, a sensor 540 senses when the door is fully closed. When the door is fully closed, sensor 540 transmits a signal to actuator 530 that causes actuator 530 to move sheet 400 into the closed position.

The presence of opening (or window) 120 (FIGS. 1 and 3) acts to assist entering and exiting the vehicle when the door is open. For example, window 120 provides a space for an occupant's feet and legs while exiting and entering the vehicle. For some motor vehicles, such as compact or sports vehicles, a panel, such as panel 134 of FIGS. 1–4, may extend upward from the rocker panel across substantially the entire extent of the door opening, causing occupants to lift their feet and legs over the panel when exiting and entering the vehicle. Automatically opening window 120 by retracting closure 400 (FIG. 4) when an occupant moves a door handle to prior to entering or exiting the vehicle and automatically closing window 120 by extending closure 400 when the door is closed further facilitate the processes of entering and exiting the vehicle. Moreover, the presence of the doors often impairs visibility while maneuvering a motor vehicle, such as during parking. For example, an operator may not be able to see the curb during parking because of the passenger door. Opening window 120 or using a transparent closure for closing window 120 acts to increase visibility when maneuvering the vehicle, such as during parking.

CONCLUSION

Embodiments of the invention provide a door of a motor vehicle having a substantially rigid sheet (or closure) that extends downwardly from a lower edge of the door. The sheet may be opaque, translucent, or transparent. The sheet may be fixed in the extended position or may be selectively retractable and extendable. For one embodiment, the closure closes an opening located below the door when the door is closed. For another embodiment, the presence of the opening acts to assist entering and exiting the vehicle when the door is open. For one embodiment, retracting the closure opens the opening and extending the closure closes the opening. For some embodiments, opening the opening or using a transparent closure for closing the opening acts to increase visibility when maneuvering the vehicle, such as during parking.

Although specific embodiments have been illustrated and described herein, it will be appreciated by those of ordinary skill in the art that any arrangement that is calculated to achieve the same purpose may be substituted for the specific embodiments shown. Many adaptations of the invention will be apparent to those of ordinary skill in the art. For example, although embodiments of a door are illustrated for the driver's side of a motor vehicle, embodiments of the invention are equally applicable to the passenger door of the vehicle. Accordingly, this application is intended to cover any adaptations or variations in the invention. It is manifestly intended that this invention be limited only by the following claims and equivalents thereof.

What is claimed is:

1. A motor vehicle, comprising:
   a door opening defined at least partially by a rocker panel; and
   a door assembly operatively connected to the door opening for movement between an open configuration and a closed configuration, the door assembly including:
   a door body having a lower edge; and
   substantially rigid panel extending downwardly from the lower edge of the door body to the rocker panel when the door assembly is in the closed configuration.

2. The motor vehicle of claim 1 further comprising a sensor configured to activate an actuator for retracting the substantially rigid panel into the door body in response to initiating movement of the door assembly from the closed configuration to the open configuration.

3. The motor vehicle of claim 1 further comprising a sensor configured to activate an actuator for extending the substantially rigid panel from the door body in response to the door assembly reaching the closed configuration from the open configuration.

4. The motor vehicle of claim 1 wherein the substantially rigid panel is transparent, translucent, or opaque.

5. The motor vehicle of claim 1 wherein the substantially rigid panel is manually or electrically extendable and retractable.

6. The motor vehicle of claim 1 wherein the substantially rigid panel is a sheet of transparent glass.

7. The motor vehicle of claim 1 wherein the substantially rigid panel is operable to retract in response to initiating movement of the door assembly from the closed configuration to the open configuration.

8. The motor vehicle of claim 1 wherein the substantially rigid panel extends in response to the door assembly reaching the closed configuration from the open configuration.

9. The motor vehicle of claim 1 wherein
the substantially rigid panel is operable to retract into the door body in response to initiating movement of the door assembly from the closed configuration to the open configuration; and
wherein the substantially rigid panel is operable to extend from the door body in response to the door assembly reaching the closed configuration from the open configuration.

10. A method of operating a door assembly of a motor vehicle, the motor vehicle including a door opening defined at least partially by a rocker panel and the door assembly operatively connected to the door opening for movement between an open configuration and a closed configuration, and the door assembly having a door body with a lower edge, the method comprising:
extending a substantially rigid panel downwardly from the lower edge of the door body to the rocker panel when the door assembly is in the closed configuration; and
retracting the substantially rigid panel into the door body to expose an opening when the door assembly is in the closed configuration.

11. The method of claim 10, wherein the step of retracting the substantially rigid panel into the door body to expose the opening when the door assembly is in the closed configuration occurs in response to a user initiating opening of the door assembly.

12. The method of claim 10, wherein the step of extending the substantially rigid panel downwardly from the lower edge of the door body to the rocker panel when the door assembly is in the closed configuration occurs in response to a user closing the door assembly.

* * * * *